(12) United States Patent
Tomasovics

(10) Patent No.: US 11,464,173 B2
(45) Date of Patent: Oct. 11, 2022

(54) HORTICULTURAL SYSTEM WITH CLOSED-LOOP LIGHT CONTROL

(71) Applicant: Aessense Technology Hong Kong Limited, Harbour (CN)

(72) Inventor: Attila Tomasovics, San Jose, CA (US)

(73) Assignee: Aessense Technology Hong Kong Limited, Harbour (CN)

( * ) Notice: Subject to any disclaimer, the term of this patent is extended or adjusted under 35 U.S.C. 154(b) by 582 days.

(21) Appl. No.: 16/289,261

(22) Filed: Feb. 28, 2019

(65) Prior Publication Data

US 2019/0261574 A1 Aug. 29, 2019

Related U.S. Application Data

(60) Provisional application No. 62/636,735, filed on Feb. 28, 2018.

(51) Int. Cl.
*A01G 7/04* (2006.01)
*F21V 23/04* (2006.01)

(52) U.S. Cl.
CPC .......... *A01G 7/045* (2013.01); *F21V 23/0471* (2013.01)

(58) Field of Classification Search
CPC ............................ F21V 23/0471; A01G 7/045
See application file for complete search history.

(56) References Cited

U.S. PATENT DOCUMENTS

| 8,373,361 | B2 * | 2/2013 | Smits | A01G 7/045 |
| | | | | 315/297 |
| 9,668,434 | B2 | 6/2017 | Kernahan | |
| 9,693,512 | B2 | 7/2017 | Chen et al. | |
| 10,798,878 | B2 * | 10/2020 | Nicole | A01G 9/14 |
| 10,842,082 | B1 * | 11/2020 | Genga, Jr. | F21V 23/0471 |
| 2011/0115385 | A1 * | 5/2011 | Waumans | A01G 7/045 |
| | | | | 315/152 |
| 2013/0258684 | A1 * | 10/2013 | Yang | A01G 7/045 |
| | | | | 362/386 |
| 2016/0021836 | A1 | 1/2016 | Kernahan | |
| 2016/0021837 | A1 | 1/2016 | Kernahan | |
| 2016/0028442 | A1 | 1/2016 | Kernahan | |
| 2016/0128289 | A1 | 5/2016 | Wong et al. | |
| 2016/0242372 | A1 | 8/2016 | Wong et al. | |
| 2016/0255781 | A1 | 9/2016 | Chen et al. | |
| 2016/0286732 | A1 * | 10/2016 | Wu | F21V 23/003 |
| 2018/0308028 | A1 | 10/2018 | Zhang et al. | |

FOREIGN PATENT DOCUMENTS

| WO | 2016014865 A1 | 1/2016 |
| WO | 2016018767 A1 | 2/2016 |

* cited by examiner

*Primary Examiner* — Arman B Fallahkhair
(74) *Attorney, Agent, or Firm* — David Millers

(57) ABSTRACT

Photosynthetically active photon flux density (PPFD) provided to plants from a grow light may be calculated based on light-canopy distance measurements, intensity measurements around the plants, and a known shape or distribution of light at the measured distance from the grow light. A controller and a method of controlling one or more grow lights can employ closed-loop techniques that repeatedly measure and adjust light until a desired PPFD is achieved and then maintained.

14 Claims, 4 Drawing Sheets

HORTICULTURAL SYSTEM WITH CLOSED-LOOP LIGHT CONTROL

CROSS-REFERENCE TO RELATED APPLICATIONS

This patent document claims benefit of the earlier filing date of U.S. patent application 62/636,735, filed Feb. 28, 2018, which is hereby incorporated by reference in its entirety.

BACKGROUND

Grow lights have been used to produce light for plants during indoor plant cultivation. In some implementations, each grow light serves and provides overhead light directed at a growth space containing one or more plants, and the top portion of the plants receive the most light. The plants may be pruned to or may otherwise be of similar height so that the tops of the plants define a surface, i.e., a plant canopy, that is relatively flat and receives a relatively uniform flux of useful light. Typically, a goal of plant cultivation is to control or maximize biomass production, and control of lighting is important to achieving that goal. In particular, the average light intensity at the plant canopy may determine how well the plants can photosynthesize and how much the plants grow, i.e., how much biomass the plants create. Generally, the rate of biomass production increases with the intensity of light until light levels become as much as the plants can use. At which point, any additional light is either wasted or is injurious to the plants. Thus average light intensity is a key component to plant cultivation and light intensity needs to be controlled precisely for optimal biomass production.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

This invention relates to smart lighting systems with sensor feedback to control light intensity that plants receive, methods for calculating light intensity provided to plants, and methods for controlling one or more grow lights. A primary use of the lighting systems is in horticultural systems such as hydroponic systems that operate grow lights based on feedback from sensors sensing photosynthetically active photon flux density (PPFD) and that provide plants in the systems with desired light intensities selected based on the characteristics of the plants being grown.

In one implementation, a light system includes one or more distance sensors and multiple light sensors that measure intensities of light or specifically PPFDs at multiple locations. The distance sensors can measure an average distance between a grow light or lights and a plant canopy, and the light sensors measure light intensities or PPFDs at various locations around a growth space for the plants. A processing module uses measurements from the sensors to determine a level of the plant canopy and determine a measured average light intensity or PPFD at the plant canopy. A control module may operate a grow light in a closed-loop process to change the power supplied to or emitted from the grow light as needed so that the measured average light intensity over the plant canopy becomes or remains at a desired average light intensity level across the plant canopy. The control module may particularly generate a control signal to control the power or brightness of the grow light or lights.

The system may further employ a set of distributed temperature sensors (typically in the same casing as light or PPFD detectors), and the temperature sensors may be used to map the canopy temperature. Light intensity from a grow light may be changed (decreased) if the average temperature of plant foliage is out of (above) the optimal range.

In horticulture, localized light intensity useful to plants may be referred to as the photosynthetically active photon flux density (PPFD), and the PPFD may be measured in $\mu moles/s/m^2$. In accordance with an aspect of the current invention, a closed-loop PPFD control system, with minimal or no human interaction, can maintain a desired PPFD at a canopy level of growing plants in a horticulture system.

Figure 1A:
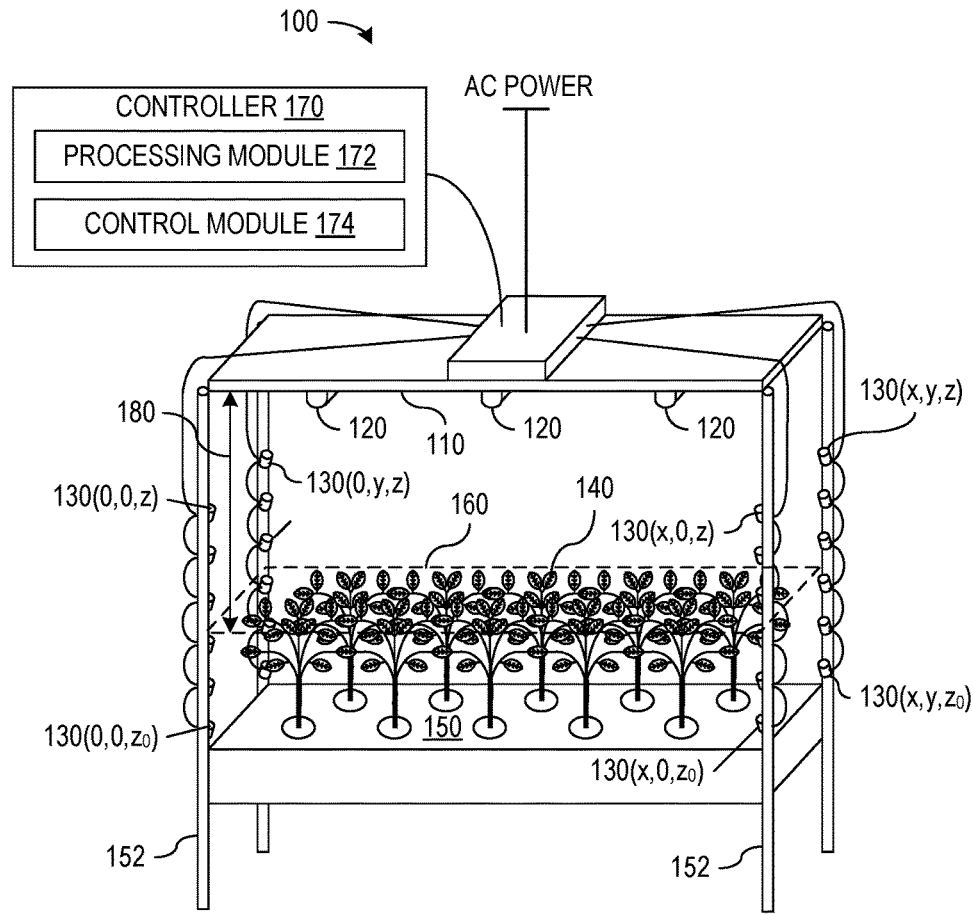
FIG. 1A shows a horticultural or plant growth system including a closed-loop grow light control system in accordance with one implementation of the invention.

FIG. 1A shows an example implementation of a horticultural system 100 in accordance with one implementation of the present invention. System 100 may, for example, be a hydroponic system for growing plants 140 in an indoor environment, and system 100 may include a structure such as a tray 150 that holds plants 140 with roots (not shown) extending below tray 150. The roots of plants 140 may be submerged in water or a nutrient solution for conventional hydroponics or may be suspected in air and subjected to a mist of nutrient solution for an aeroponics version of hydroponics. Alternatively, plants 140 may grow in soil or other media under tray 150. Plants 140 grow upward, and foliage at the tops of plants 140 forms a plant canopy and defines a plant canopy level 160. Plant canopy level 160 corresponds to a horizontal plane that effectively approximates the light absorbing surface of the plant canopy, and plant canopy level 160 has a location or height that depends on the heights, shapes, and foliage of plants 140.

A grow light 110 is above plant canopy level 160 and operates to provide light, i.e., photons, for photosynthesis in plants 140. Current grow light systems providing high energy efficiency often employ Light Emitting Diode (LED) lighting, and grow light 110 may, for example, include a flat LED panel, multiple LED panels, or a set of LED bars. Grow light 110 may further contain a control/communication interface, one or more LED drivers (AC/DC power converters), one or more LED light engines, e.g., a collection of LED chips on a board with heat sinks and mechanical parts. If a particularly high light intensity is desired, grow light 110 may include a high-luminosity light source such as a high pressure sodium (HPS) light fixture including of a ballast, a frame, a reflector, and a bulb. Other types of lighting technology such as incandescent, fluorescent, or glow discharge lighting systems could also or alternatively be used.

System 100 employs a closed-loop control system to maintain a target or desired PPFD at plant canopy level 160. To do so, the closed-loop system includes a controller 170, one or more distance sensors 120, and distributed canopy sensors 130.

Controller 170 may be a computing system, e.g., a microcontroller mounted on a printed circuit board with associated memory for data, software, or firmware and with I/O or other circuitry for control of and communication with devices in system 100 and for communication with external command or control systems (not shown). In the embodiment of FIG. 1A, controller 170 may be part of a local control unit that controls the operation of devices in system 100. For example, control unit 170 may distribute AC power to devices in system 100. Controller 170 may be programmable, and in the illustrated embodiment, controller 170 implements a processing module 172 and a control module 174 having functions described further below.

Distance sensors 120 are positioned and configured to measure one or more distances to plants 140, and the measured distances may indicate a distance 180 between grow light 110 and plant canopy level 160. Distance sensors 120 may measure distances to plants 140 using ultrasonic, infrared, laser, time-of-flight, or any other distance sensing techniques. Generally, the measured distances between grow light 110 and the tops of plants 140 vary because of variations in the shapes and heights of plants 140 and because plants 140 may not provide an ideal surface for distance measurements. Distance 180 to plant canopy level 160 may be determined as described further below using distance measurements from distance sensors 120 and/or measurements from distributed light sensors 130.

Each of the distributed light sensor 130 may be configured to measure PPFD or light intensity in a specific wavelength band at a specific location, e.g., at the location of the sensor 130. Distributed sensors 130 may particularly sense the intensity of light having relevant wavelengths for photosynthesis. Sensors 130 may be implemented as using photodiodes with appropriate filters to measure the intensity of photosynthetically active light. For example, various photodiodes or phototransistors with or without optical filters may measure the average intensity of light with specific wavelengths at the locations of the photodiodes or phototransistors. Whether or not sensors 130 measure only photons that are useful for photosynthesis, each sensor 130 or another component of the feedback system, e.g., controller 170, may determine a PPFD measurement using an intensity measurement and a light intensity response curve that correlates the measured intensity with the density of photosynthetically active photons. In some configurations, each sensor 130 includes both a PPFD sensor and a temperature sensor.

In the implementation of FIG. 1A, distributed light sensors 130 include multiple sets, particularly four sets, of vertically-arranged sensors $\{130(0,0,z_0), \ldots 130(0,0,z)\}$ to $\{130(x,y,z_0), \ldots 130(x,y,z)\}$ located at different locations relative to the area of tray 150, e.g., at multiple locations around the perimeter of the plant growth area, and each of the vertically-arranged sets $\{130(0,0,z_4), \ldots 130(0,0,z)\}$ to $\{130(x,y,z_0), \ldots 130(x,y,z)\}$ contains light sensors 130 at different heights above tray 150. More generally, light sensors 130 may be distributed in any manner such that at any expected height of plants 140, some light sensors 130 may be above plant canopy level 160, while some other light sensors 130 may be below plant canopy level 160. Due to shading by plants 140, sensors 130 below plant canopy level 160 generally receive significantly less light than do sensors 130 above the plant canopy level 160.

Figure 2A:
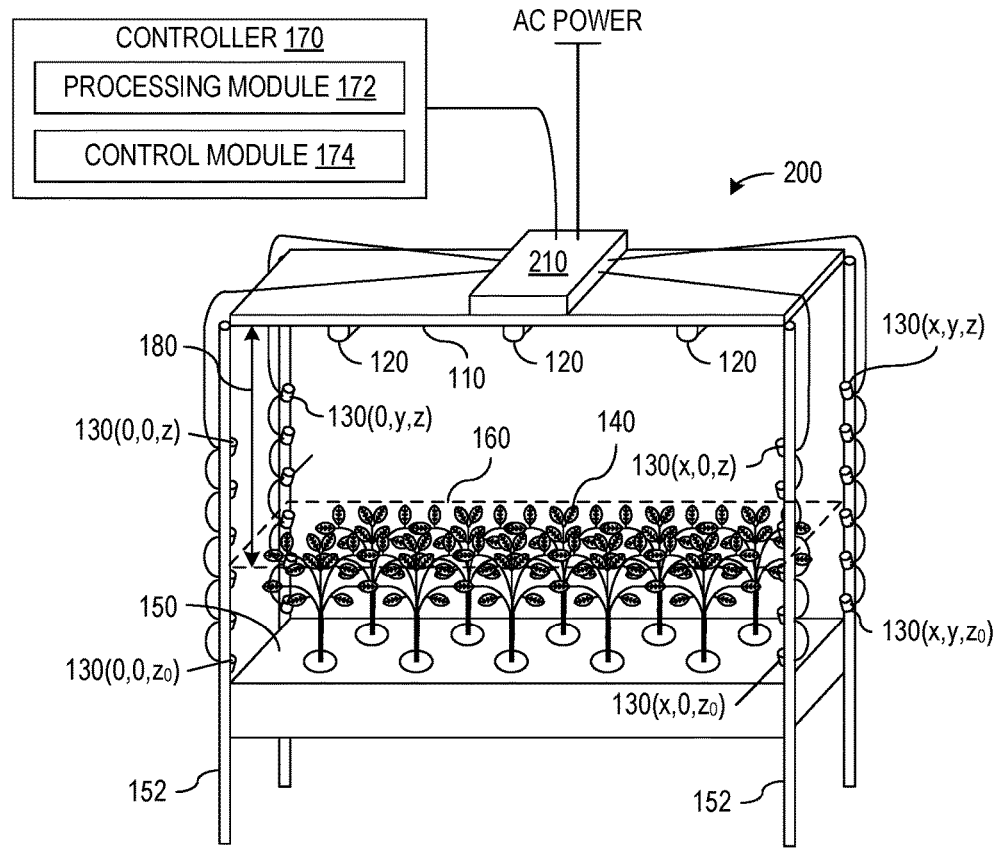
FIG. 2A shows a module in a horticultural or plant growth system including a local communication hub that allows the module to share a controller with other modules.

FIG. 2A shows an alternative horticultural system 200 that has many of the same components as system 100 of FIG. 1A, but horticultural system 200 employs a communication hub 210 between sensors 130 and controller 170. Communication hub 210, which may be above grow light 110 or elsewhere in the horticultural system 200, may have dedicated connectors respectively connected to the daisy chains of light sensors 130. Specifically, the vertically-arranged sets of light sensors 130 at XY-coordinates (0,0), (0,y), (x,0), and (x,y), may connect to respective dedicated ports of communication hub 210. Communication hub 210 may also connect to sensors 120 and to other devices in system 200 and may conduct all communications between system 200 and controller 170. As described further below, hub 210 may permit multiple horticultural systems 200 to share one controller 170. Controller 170 when shared may be part of a control unit or module (not shown) that is separate from horticultural systems 200 that share the same controller 170.

In either configuration, each sensor 120 or 130 or each group of sensors 120 or 130 may have the ability to sense and store multiple measurements, to optionally pre-filter the measurement data, and to send accumulated raw or filtered data to controller 170.

Figure 1B:
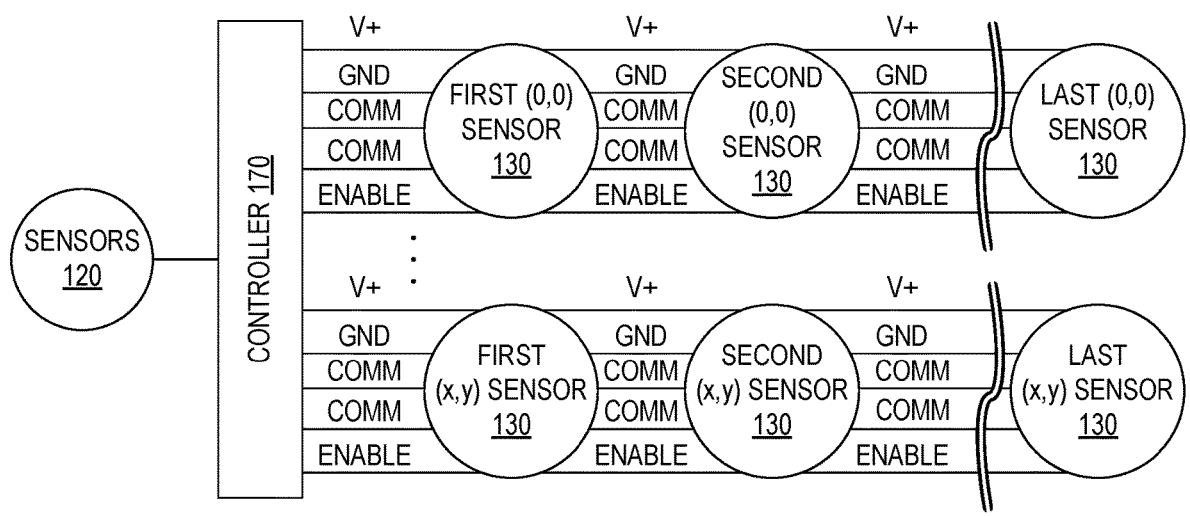
FIG. 1B illustrates connections of a set of PPFD sensors to each other and to a controller in the system of FIG. 1A.
Figure 2B:
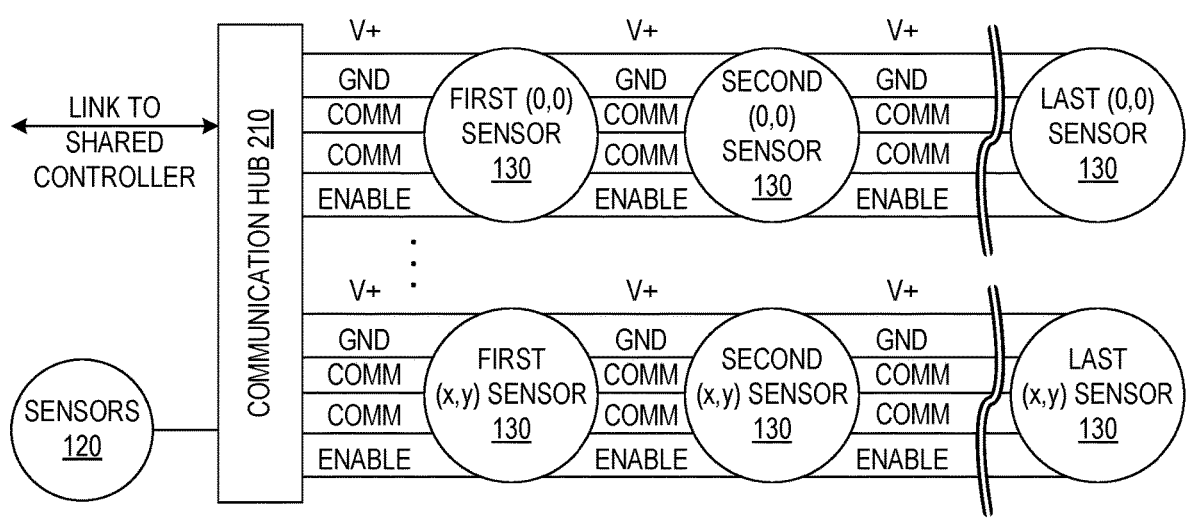
FIG. 2B illustrates connections of a set of PPFD sensors to each other and to the communication hub in the system of FIG. 2A.

In an example implementation, each sensor 130 in a vertically-arranged set is in a communication line has a fixed identifier set according to the sensor's predetermined location coordinates, aka, auto-indexing. In a serial wired communication setup such as shown in FIGS. 1B and 2B, sensor identifiers can be automatically generated during power-up based on physical locations of sensors 130 along a cable (daisy chain). For example, sensors 130 may be arranged into four daisy chains located along the four vertical support bars 152, e.g., at XY-coordinates (0,0), (0,y), (x,0), or (x,y), as shown in FIG. 1A or 2A, and each daisy chained set may be connected to controller 170 or hub 210 using wires as shown in FIG. 1B or 2B.

A power up operation for system 100 or 200 may automatically assign vertical addresses to vertically-arranged light sensors 130. In particular, at the beginning of a startup process, the sensor 130 closest to controller 170 or hub 210 (the "first sensor") in a daisy chain may receive an enable signal first, e.g., on a dedicated wire from controller 170 or hub 210 to the first sensor 130. The first sensor 130 can then communicate with controller 170 or hub 210 and be assigned a vertical address (i.e., coordinate z for the first light sensor 130). Once the first light sensor 130 has its vertical address that sensor 130 sends an enable signal on a dedicated wire to the next sensor 130 in the chain, which upon receiving the enable signal obtains its vertical address from controller 170 or hub 210. Each sensor 130 in a chain can repeat the process until the last sensor 130 is enabled and assigned a vertical address (i.e., coordinate $z_0$ for the last light sensor 130).

Sensors 130 in system 100 or 200 may alternatively communicate wirelessly, in which case sensors 130 may need to be manually commissioned. The process may otherwise use the same or a similar process to provide controller 170 with measurement data from known locations in the growth space of horticultural system 100 or 200.

Controller 170 operates grow light 110 and may control the power supplied to grow light 110 (and thereby the intensity of light emitted from grow light 110) in order to achieve or maintain a desired PPFD at plant canopy level 160. The actual PPFD at canopy level 160 generally depends on five variables, namely the brightness of grow light 110, the spatial distribution of the light from grow light 110, the distance between grow light 110 and plant canopy level 160, the area of the plant canopy, and the shape of the plant canopy. The power supply or brightness of grow light 110 is a variable that controller 170 as disclosed herein can set and change. The spatial distributions of light from grow light 110 at different distances may be known or determined through measurements, e.g., a calibration operation. The distance between grow light 110 and plant canopy level 160 is not constant because plants 140 grow, but the distance can be measured or determined as described further below. The area of the plant canopy may be known from the area of tray 150 on which plants 140 grow. For plants of the same age and type being grown together in a plant growth space, the shape of the plant canopy may be approximated as a horizontal flat plane, i.e., plant canopy level 160. Controller 170 may calculate or determine an actual or measured average PPFD in an area in plant canopy level 160 by combining the known light power distribution of grow light 110, with the grow light to plant canopy distance measurements from sensors 120, and/or the distributed PPFD measurements at known locations of sensors 130. Controller 170 may then automatically adjust the brightness of grow light 110 until the actual of measured PPFD at canopy level 160 is equal to the desired or target average PPFD at the canopy level 160 or until the actual average PPFD at canopy level is as close to the desired PPFD as possible while keeping the temperature of the plant canopy within a desired range.

Controller 170 may determine or identify the distance from grow light 110 to plant canopy level 160 based on the measurements from distance sensors 120 and/or based on the intensity measurements from PPFD sensors 130. In general, the distance measurements from multiple distance sensors 120 may differ because the plant canopy is not a solid uniform surface, but an average of the distance measurements may provide a reliable measurement of the location of plant canopy level 160. Alternatively, the intensity measurements from sensors 130 may identify canopy level 160. In particular, an abrupt drop in intensity measured by one PPFD sensor 130 and a PPFD sensor 130 directly below may indicate that the plant canopy shades the lower PPFD sensor 130 but does not shade the upper PPFD sensor 130. Canopy level 160 may thus be identified as being between shaded and unshaped PPFD sensors 130. In one implementation, a processing module 172 in controller 170 determines distance 180 to canopy level 160 using an average, e.g., a weighted average, of the distance measurements from distance sensors 120. In a second configuration, processing module 172 determines distance 180 from grow light 110 to canopy level 160 based on a weighted average of both the distance measurements from distance sensors 120 and the inferred distances determined from intensity measurements from the multiple sets of vertically-arranged PPFD sensors 130. In a third embodiment, processing module 172 can determine distance 180 from grow light 110 to canopy level 160 solely from the intensity measurements of PPFD sensors 130, and distance sensors 120 may be omitted from system 100 or 200.

Figure 3A:
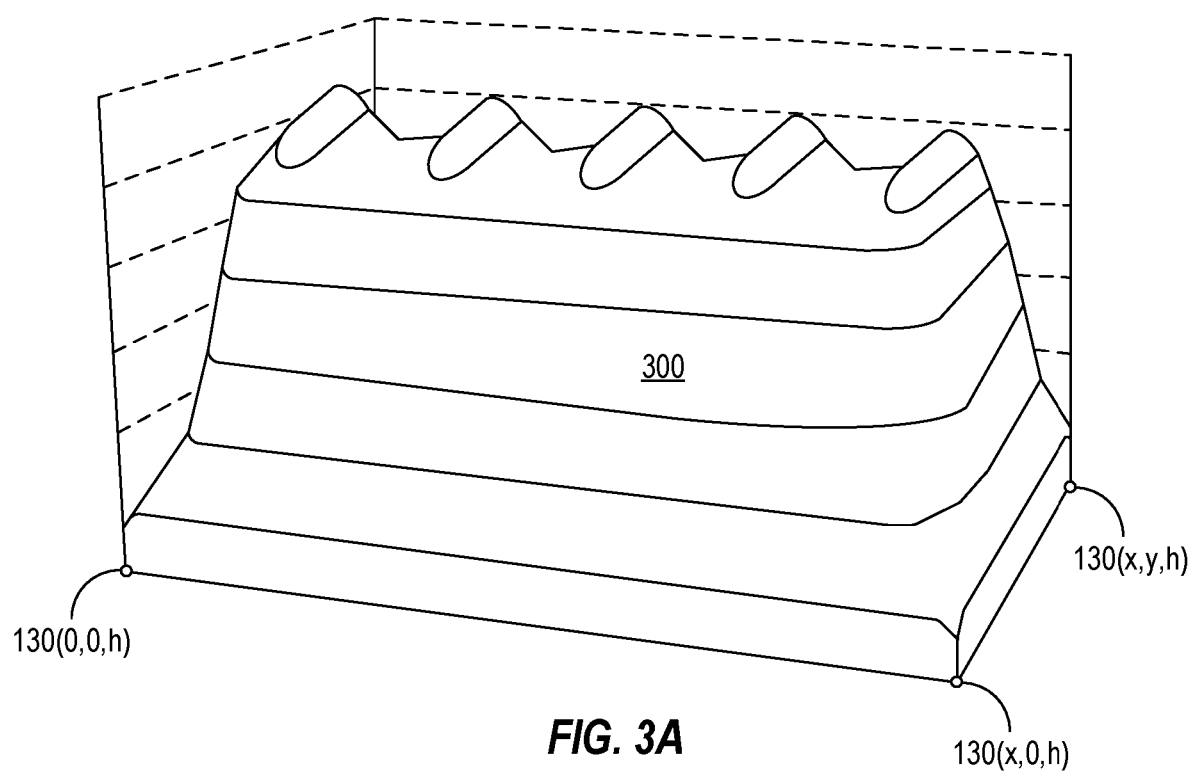
FIGS. 3A and 3B respectively show perspective and top views of a plot showing spatial variation in a photosynthetically active photon flux density in an area at a fixed distance from a grow light system.
Figure 3B:
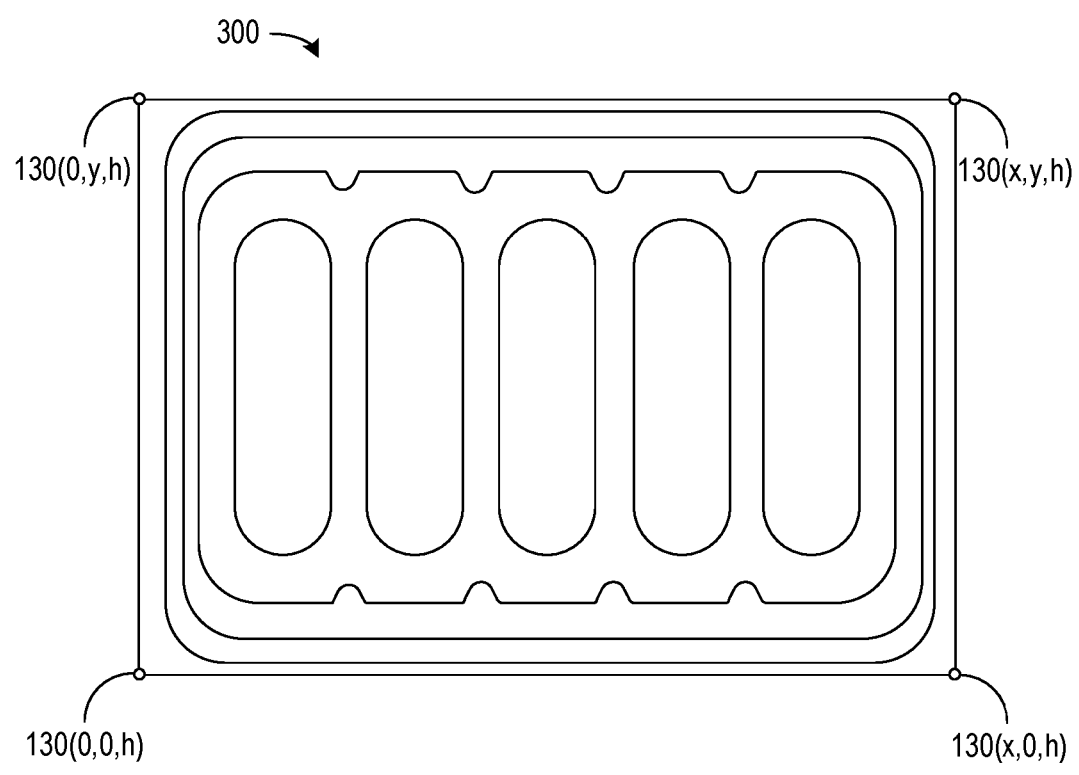

Direct PPFD measurement around the canopy can also be used to determine the current average PPFD at canopy level 160. In particular, in a plane at a specific distance 180 from grow light 110 (or at a specific height h above tray 150), the light received from grow light 110 may have an intensity with a spatial distribution characteristic of grow light 110. The shape or pattern of the spatial distribution can be measured, for example, at a factory or during installation of grow light 110 in horticultural system 100. FIGS. 3A and 3B respectively show a perspective view and a top view of an example plot 300 showing the spatial distribution of relevant light intensity or PPFD received from an implementation of grow light 110 in an area, e.g., a 100 cm by 140 cm area, containing a set of PPFD sensors 130 at the same height h above tray 150. (It may be noted that plot 300 illustrates an intensity pattern characteristic of a particular grow light 110 including multiple linear tubes, bars, or other lighting elements that may be operated simultaneously as a unit.) In general, the brightness setting of grow light 110 changes the scale or height of an intensity distribution in an area, but the shape or pattern of the distribution is (at least relatively) independent of the brightness setting of the grow light 110. Accordingly, measurements of intensity by PPFD sensors 130(0,0,h), 130($x$,0,h), 130(0,y,h), and 130($x,y,h$) determine a scale for plot 300, which corresponds to height h. From the scale of the plot at height h, the scale of the PPFD plot at the location of plant canopy level 160 can be determined, and from the known shape of the plot for the location canopy level 160, processing module 172 can determine the average PPFD over the entire area of plant canopy level 160.

The shapes of the spatial distributions of intensity or PPFD received in planes generally depend on the distances of the planes from grow light 110. In one implementation, processing module 172 may employ grow light calibration data, e.g., look-up tables or conversion factors corresponding to planes containing PPFD sensors 130, and processing module 172 can use measurements from the PPFD sensors 130 closest to plant canopy level 160 to determine the average PPFD at canopy level 160. Alternatively, a measured average PPFD at canopy level can be calculated based on the spatial power distribution of light emitted by grow light 110 at the current drive power setting and distance 180 to canopy level 160. Use of PPFD sensors 130, instead of the current drive power setting, to provide a scale for the PPFD distribution may beneficially account for changes in, e.g., dimming of, grow light 110, which may result from aging or use. An average of the two results may increase precision of the measured average PPFD at canopy level 160.

A desired average PPFD at canopy level 160 may be known for the type of plant 140 being grown and may depend on other factors such as (but not limited to) the growth stage of plants 140, the average heights of plants 140, and the time of day, and controller 170 may operate grow light 110 to achieve and maintain the desired PPFD at canopy level 160. In particular, controller 170 upon determining the measured average PPFD at canopy level 160 can compare the measured average PPFD to the current desired PPFD. If the measured average PPFD and the desired PPFD differ, a control module 174 in controller 170 can generate a signal to adjust, i.e., increase or decrease, the brightness setting of grow light 110. Measurements and adjustments may be repeated, in closed-loop fashion, until the desired PPFD at canopy level 160 is achieved and may be repeated periodically thereafter to maintain the desired PPFD or to adjust to changes in the desired PPFD as plants 140 grow or as grow light 110 ages and dims.

Figure 4:
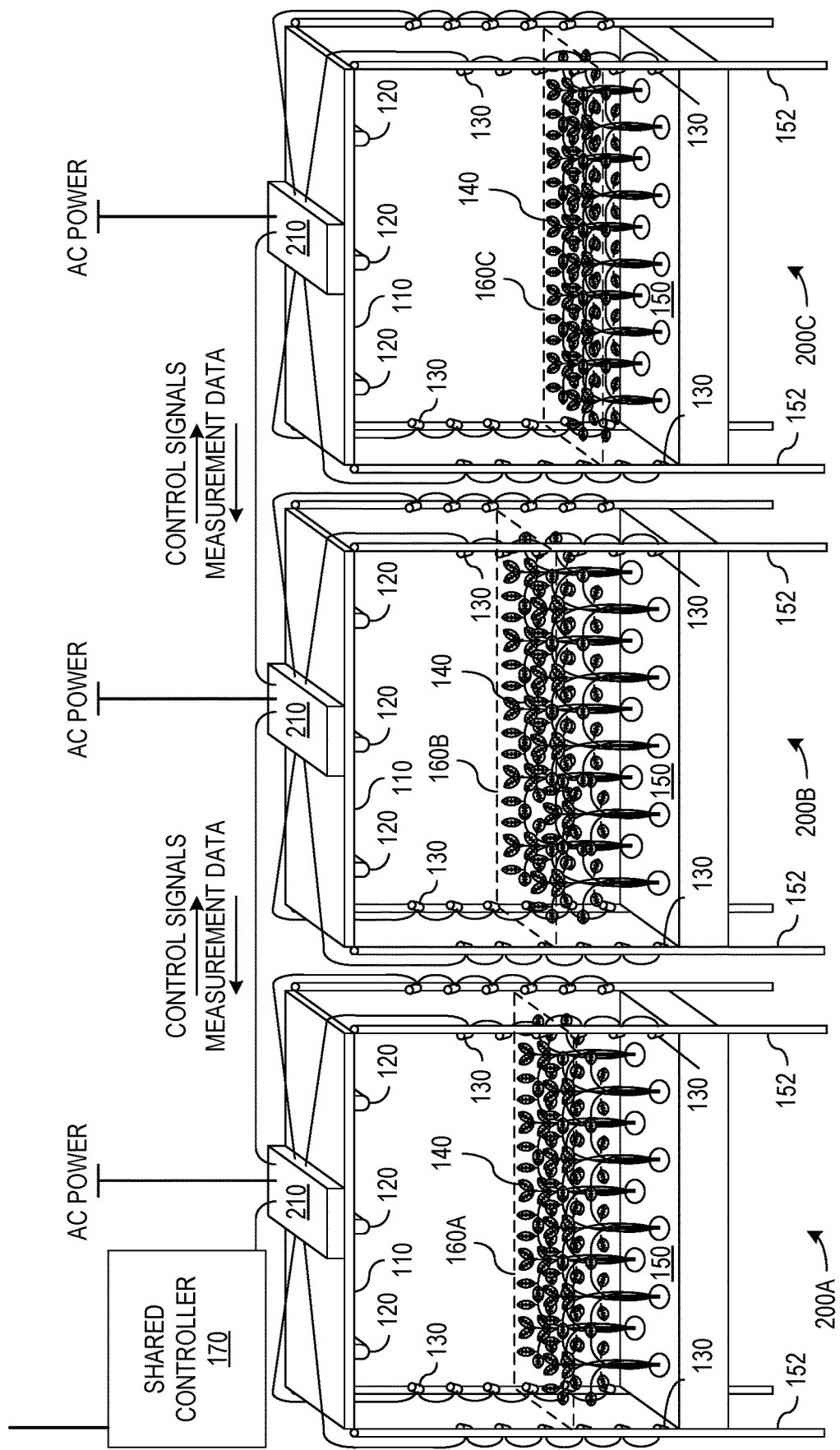
FIG. 4 shows a horticultural or plant growth system including a shared light control system and multiple plant-growth modules with respective plant grow lights.

FIG. 4 shows another implementation of a horticultural system 400 containing multiple growth space modules 200A, 200B, and 200C having separate grow lights 110. For example, modules 200A, 200B, and 200C may be similar or identical to horticultural system 200 of FIG. 2A and may be arranged and connected together in a row with each module 200A, 200B, or 200C containing growth space for plants 140, grow lights 110, distance sensors 120, and distributed PPFD sensors 130 as described above. Each module 200A, 200B, or 200C may further include a hub 210 that communicates with sensors 120 and 130 in that module 200A, 200B, or 200C and communicates with a shared grow light controller 170. In general, modules 200A, 200B, and 200C may contain different types of plants or plants of different ages or heights. In the illustrated implementation, a single controller 170 may receive measurements from distance sensors 120 and PPFD sensors 130 in all of modules 200A, 200B, and 200C, may determine the locations of canopy levels 160A, 160B, and 160C and the average PPFDs respectively at the different canopy levels 160A, 160B, and 160C in respective modules 200A, 200B, and 200C. Shared controller 170 may adjust the brightness settings of grow lights 110 in modules 200A, 200B, and 200C, so that plant canopies 160A, 160B, and 160C respectively receive their desired average PPFDs. Shared controller 170 may further include or implement modules for operation of other horticultural systems in or for the connected modules 200A, 200B, and 200C. For example, in addition to grow lights 110, the controller may further control operation of watering, drainage, ventilation, heating, or cooling systems and systems for creating, mixing, measuring, or delivering nutrient solutions.

Each of modules disclosed herein may include, for example, hardware devices including electronic circuitry for implementing the functionality described herein. In addition or as an alternative, each module may be partly or fully implemented by a processor executing instructions encoded on a machine-readable storage medium.

All or portions of some of the above-described methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A horticultural system comprising:
   a plant growth space;
   a light source positioned to illuminate the plant growth space;
   a plurality of light sensors distributed in the plant growth space, the plurality of light sensors including a vertically-arranged set of the light sensors that produce intensity measurements; and
   a controller controlling the light source based on measurements received from the light sensors, the controller determining a level of a plant canopy and a measured average intensity at the plant canopy using intensities measured by the light sensors in the vertically-arranged set and, based on the level of the plant canopy and the measured average intensity, controlling the light source to provide a desired average intensity of light at the plant canopy, wherein the controller is configured to execute a process including:
   accessing a portion of calibration data that corresponds to the level of the plant canopy and that represents a shape of a spatial power distribution that the light source produces at the level of the plant canopy;
   using intensity measurements from the light sensors to determine a scale for the spatial power distribution;
   calculating the measured average intensity of light based on the shape of the distribution of light and the scale; and
   controlling the light source so that the measured average intensity is equal to the desired average intensity.

2. The system of claim 1, wherein the plurality of light sensors includes a plurality of vertically-arranged sets of the light sensors.

3. The system of claim 2, further comprising a plurality of vertical support bars along which the plurality of vertically-arranged sets respectively extend.

4. The system of claim 1, wherein the controller executes a closed-loop process that repeats adjusting brightness of the light source and using intensity measurements from the light sensors to produce and maintain a desired average intensity of light at the level of the plant canopy in the growth space.

5. The system of claim 4, wherein the desired average intensity corresponds to a desired Photosynthetically active Photon Flux Density (PPFD) at the level of the plant canopy.

6. The system of claim 1, wherein the controller is configured to determine level of the plant canopy using differences in the intensities measured by adjacent light sensors in the vertically-arranged set.

7. The system of claim 1, further comprising one or more distance sensors positioned to measure a distance between the light source and the plant canopy in the growth space, wherein the controller is further configured to determine the level of the plant canopy using one or more distance measurements from the one or more distance sensors and using the intensities measured by the light sensors.

8. The system of claim 1, wherein the controller executing the process further includes
   altering a drive level of the light source in response to the average intensity differing from the desired average intensity.

9. The system of claim 1, wherein the calibration data includes results from a process including;
   measuring a plurality of spatial power distributions light from the light source respectively at a plurality of planes below the light source; and
   storing a plurality of portions of the calibration data representing respective shapes of the spatial power distributions in the planes; and wherein
   accessing the portion of the calibration data corresponding to the level of the plant canopy comprises accessing the portion representing the spatial power distribution in the plane closest to the level of the plant canopy.

10. The system of 1, wherein the vertically-arranged set of the light sensors are connected to a cable and form a daisy chain, the system assigning each of the light sensors an identifier according to a position of the light sensor along the cable.

11. A method associated with operating a horticultural system, the method comprising:
   measuring a plurality of spatial power distributions of light from a grow light of the horticultural system respectively at a plurality of planes below the grow light;
   based on the measuring, generating calibration data representing respective shapes of the spatial power distributions in the planes;
   storing in the horticultural system the calibration data representing the respective shapes of the spatial power distributions in the planes; and operating the horticultural system to perform a process including:
    determining a distance between the grow light and a plant canopy in a growth space of the horticultural system;
    accessing a portion of the calibration data representing the spatial power distribution in the plane closest to the level of the plant canopy;
    measuring a light intensity at a location in the growth space to determine a scale for light intensity at the canopy;
    determining an average light intensity at the plant canopy using the scale and a portion of the calibration data representing the shape of one of the spatial distributions closest to the distance between the grow light and the plant canopy; and
    altering a power level of the grow light in response to the average light intensity being different from a desired average light intensity on the plant canopy.

12. The method of claim 11, wherein determining the distance comprises:
    measuring light intensities at a plurality of locations in the growth space; and
    identifying the distance using changes in the light intensities measured at different locations in the growth space.

13. The method of claim 12, wherein determining the distance further comprises:
    measuring with a distance sensor, a measured distance from the grow light to plants growing in the growth space; and
    identifying the distance using a combination of the measured distance and the locations of changes in the light intensities measured at different locations in the growth space.

14. The method of claim 11, wherein determining the distance comprises measuring with a distance sensor, a distance from the grow light to plants growing in the growth space.

* * * * *